United States Patent [19]

Verber et al.

[11] 4,453,801

[45] Jun. 12, 1984

[54] PROTECTED LUNEBURG LENS

[75] Inventors: Carl M. Verber; James R. Busch, both of Columbus, Ohio

[73] Assignee: Canon Kabushiki Kaisha, Tokyo, Japan

[21] Appl. No.: 254,471

[22] Filed: Apr. 15, 1981

[51] Int. Cl.$^3$ .............................. G02B 5/172
[52] U.S. Cl. ................................. 350/96.12
[58] Field of Search ............... 350/96.11, 96.12, 96.13, 350/96.31; 343/911 L

[56] References Cited

U.S. PATENT DOCUMENTS

| 4,253,060 | 2/1981 | Chen | 350/96.14 |
| 4,273,445 | 6/1981 | Thompson et al. | 350/96.11 |
| 4,297,704 | 10/1981 | Marom et al. | 350/96.13 |
| 4,348,074 | 9/1982 | Burns et al. | 350/96.12 |

OTHER PUBLICATIONS

S. K. Yao, et al., Guided-Wave Optical Thin-Film Luneburg Lenses; Fabrication Technique and Properties, Appl. Optics, 18, 4067 (Dec. 1979).
J. S. Berkes, et al., Photodecomposition of Amorphous $As_2Se_3$ and $As_2S_3$, J. Appl. Phys., 42, 4908 (Nov. 1971).
R. G. Brandes, et al. Optically Formed Dielectric Gratings in Thick Films of Arsenic-Sulfur Glass, Applied Optics, 9, 1712 Jul. 1970.
Y. Ohmachi and T. Igo, Laser-Induced Refractive-Index Change in As-S-Ge Glasses, App. Phys. Letter, 20,506 (Jun. 1972).
S. K. Yao, Theoretical Model of Thin-Film Deposition Profile with Shadow Effect, J. App. Physc., 50, 3390 (May 1979).
S. K. Yao and D. B. Anderson, Shadow Sputtering Diffraction-Limited Waveguide Luneburg Lenses, App. Physc. Lett. 33,307 Aug. 1978.
S. A. Keneman, et al., Evaporated Films of Arsenic Trisulfide: Dependence of Optical Properties on Light Exposure and Heat Cycling, J. Opt. Soc. Am., 68, 32 (Jan. 1978).

*Primary Examiner*—John D. Lee
*Assistant Examiner*—Robert E. Wise
*Attorney, Agent, or Firm*—Fitzpatrick, Cella, Harper & Scinto

[57] ABSTRACT

A Luneburg lens formed on an optical waveguide has a protective coating to assure stable optical characteristics by preventing changes in the focal length due to exposure to surrounding light and/or moisture. The Luneburg lens may be of $As_2S_3$ material provided on a Ti in-diffused $LiNbO_3$ waveguide.

9 Claims, 3 Drawing Figures

PROTECTED LUNEBURG LENS

BACKGROUND OF THE INVENTION

1. Field of the Invention

The present invention relates to integrated optical waveguides and more particularly to a Luneburg lens provided on an optical waveguide and having a protective coating.

2. Description of the Prior Art

Integrated optics is an attractive approach for providing new devices for signal processing such as scanners, deflectors, modulators, switches, RF spectrum analyzers, convolvers, correlators, multiplexers and demultiplexers, because of the potential for very high performance operation and high speed processing using optical processing principles in structures which can be very small and rigid in planar configuration, and which can be manufactured by batch fabrication techniques.

Such devices need thin-film waveguide lenses to control the shape of the guided beam for imaging, spatial filtering, focusing and Fourier analysis. The lenses for these applications must have high efficiency, high performance and high stability. Further, lens accuracy, meaning that the focal length of the lens shape is accurate enough to satisfy design specifications, is essential for more precise applications such as where a well-collimated guided beam or sufficiently small beam spot size is needed.

One conventional type of integrated optical lens is the Luneburg lens. This lens is a classical index-graded lens having a circularly symmetric refractive index distribution which preferably focuses the arc of a fixed circle onto the arc of a second fixed circle. It is fabricated by sputtering or evaporating the lens material onto the waveguide surface through a circular mask with shaped edges. S. K. Yao, et al., *Guided-Wave Optical Thin-Film Luneburg Lenses: Fabrication Technique and Properties*, Appl. Optics, 18, 4067 (1979).

In devices requiring a high refractive index Luneburg lens, chalcogenide glasses have been found particularly suitable. However a lens formed from a chalcogenide glass may have the disadvantage that its optical characteristics may not be stable due to the adverse effects of light and/or moisture.

SUMMARY OF THE INVENTION

The present invention overcomes the disadvantages of the prior art by means of a Luneburg lens which has stable optical properties.

In accordance with one aspect of the invention there is provided a protected Luneberg lens comprising a Luneburg lens overlay on an optical waveguide, the overlay having a refractive index higher than that of the waveguide, and a protective coating on said overlay for protecting the overlay from atmospheric influences.

The protective coating prevents the lens material from changing its focal length even after long periods of exposure to room light and prevents moisture penetration from the surrounding atmosphere so that there is no change in the refractive index of the lens. This protective coating may preferably include a first protective film layer having a refractive index lower than that of the overlay and a second film layer for reflecting external light.

We have found that $As_2S_3$ is especially suitable as a material for evaporation to form a thin-film Luneburg lens on a waveguide of high efficiency and high performance which is formed by thermal diffusion of titanium film deposited on a ferroelectric crystal substrate of $LiNbO_3$. A titanium in-diffused $LiNbO_3$ waveguide has low-loss light propagation characteristics ($\sim 1$ dB/cm) and a high acousto-optical figure of merit. Moreover, the refractive indices of $As_2S_3$ and a Ti indiffused $LiNbO_3$ waveguide are approximately 2.37 and 2.27, respectively, at the $Tm_o$ waveguide mode, for a laser diode having a 0.8300 micron wavelength in air and approximately 2.39 and 2.29, respectively, for an He-Ne laser having a 0.6328 micron wavelength in air. Therefore, an $As_2S_3$ Luneburg lens serves as an efficient focusing or collimating lens for such wavelength light propagating within a waveguide of Ti in-diffused $LiNbO_3$. The combination of a thin-film $As_2S_3$ Luneburg lens on a Ti in-diffused $LiNbO_3$ waveguide is therefore particularly suitable for a device such as an RF spectrum analyzer or beam scanning module because of the low-loss light propagation characteristics and high acousto-optical figure of merit of the waveguide and the large lens power of the $As_2S_3$ Luneburg lens obtained by the large difference of refractive indices between the waveguide and the lens.

However, evaporated films of $As_2S_3$ are known to have light-induced optical changes in their refractive indices, i.e., the photorefractive effect. It is natural that the focal length of an $As_2S_3$ lens varies as a result of the refractive index change of the lens material upon exposure to light from an incandescent lamp or surrounding light. This then is a severe drawback to the use of an $As_2S_3$ Luneburg lens on a Ti in-diffused $LiNbO_3$ waveguide.

Therefore, in accordance with another aspect of the present invention, there is provided a protected Luneburg lens comprising a Luneburg lens overlay comprising $As_2S_3$ formed on an $LiNbO_3$ waveguide and a coating on said $As_2S_3$ overlay for protecting said overlay from atmospheric influences.

There has thus been outlined the more important features of the invention in order that the detailed description thereof that follows may be better understood and in order that the present contribution to the art may be better appreciated. There are, of course, additional features of the invention which will be described hereinafter and which will form the subject of the claims appended hereto. Those skilled in the art will appreciate that this invention may be utilized as a basis for designing other structures for carrying out the several purposes of the invention. It is therefore important that the claims be regarded as including such equivalent constructions as do not depart from the scope of the invention.

BRIEF DESCRIPTION OF THE DRAWINGS

A single embodiment of the invention have been chosen for purposes of illustration and description, as shown in the accompanying drawings forming a part of the specification, wherein.

DETAILED DESCRIPTION OF THE PREFERRED EMBODIMENT

Figure 1:
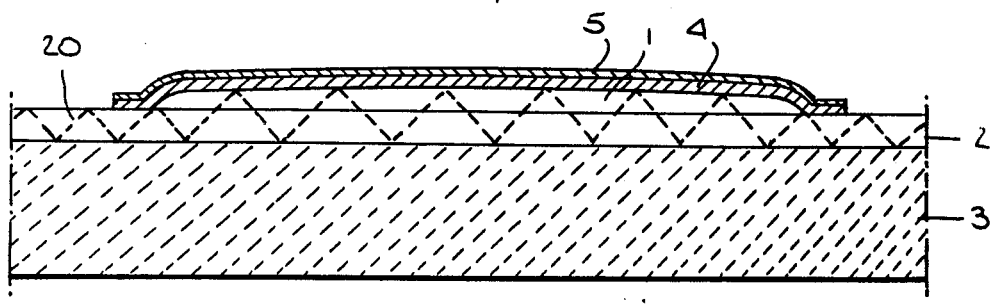
FIG. 1 is a schematic section view of a Luneburg lens having a protective coating in accordance with the present invention.

FIG. 1 shows a circularly symmetric Luneburg lens overlay 1 of As$_2$S$_3$ formed by mask evaporation on a film waveguide 2 of a material having a lower refractive index than that of the overlay material. The waveguide 2 is provided on a substrate 3, which may be Y-cut LiNbO$_3$ or other material. Moreover, the waveguide 2 has a slightly higher refractive index than that of substrate 3 to satisfy the light propagation condition in the waveguide.

It will be appreciated that while a Luneburg lens formed by evaporating As$_2$S$_3$ will include primarily As$_2$S$_3$, the as-deposited lens may also include some arsenic-sulfur compounds of different proportions.

On top of overlay 1 there is provided a first film layer 4 having a refractive index as low as possible below those of overlay 1 and waveguide 2. Preferably the first film layer has a refractive index between about 1.30 and 2.10. Film layer 4 preferably has a thickness of about 1,000 Å or more and acts to prevent the propagating light 20 in waveguide 2 and overlay 1 from escaping. Materials suitable for film layer 4 are well known and include an organic photoresist or other material which can be formed on the overlay without thermally degrading the overlay.

On top of film layer 4 there is provided a second film layer which is preferably 500 Å or more thick and which reflects external light to prevent it from entering the first film layer 4 and overlay 1. Materials suitable for film layer 5 are well known and include, for example, metal films of Au, Al or Ag. Alternatively, film layer 5 may be a highly reflective member formed with alternating layers of a high and low refractive index dielectric materials.

Film layers 4 and 5, which are typically deposited through a mask, have larger diameters than that of the overlay 1 to ensure covering the overlay 1 completely from even obliquely-incident external light. Because of the relatively low refractive index of film layer 4 there is no significant perturbation of the Luneburg lens due to film layers 4 and 5.

Figure 2:
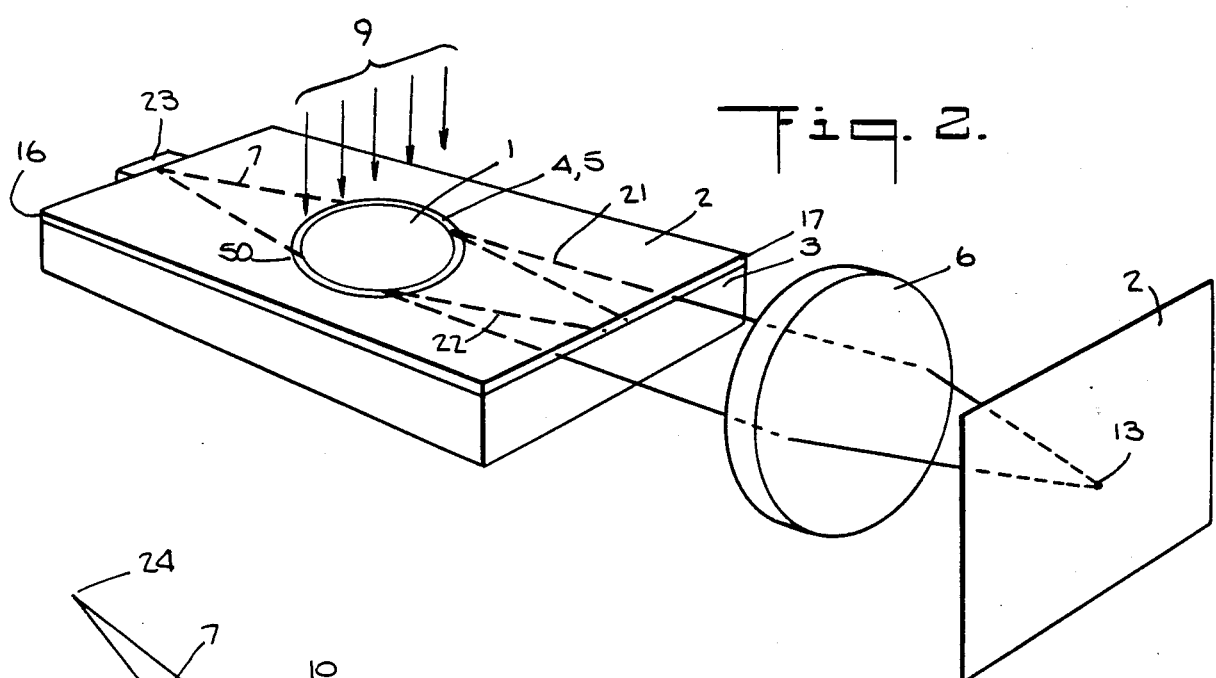
FIG. 2 is a perspective view of the protected Luneburg lens of FIG. 1 utilized as a collimating lens.

FIG. 2 shows a protected Luneburg lens according to the present invention incorporated into an optical waveguide. A laser diode 23 is butt-coupled at one end face 16 of a Ti in-diffused waveguide 2 and emits a divergent sheet of light 7 which is collimated by protected Luneburg lens 50 having an As$_2$S$_3$ overlay 1 and protective film layers 4 and 5. Collimated light 21 from the Luneburg lens moves through waveguide 2 on substrate 3 and is output at another end face 17 into the air where it is focused to a spot 13 on focal plane 8 by means of an auxiliary lens 6. The thin film optical waveguide 2 has an index of refraction less than that of the As$_2$S$_3$. A Ti in-diffused LiNbO$_3$ layer, about 1 micron thick, depending on design characteristics, may be used as the waveguide 2. The substrate is typically of Y-cut LiNbO$_3$.

On exposure to external light 9, the protective film layer 5 reflects light 9 nearly completely. Therefore, the focal length of the As$_2$S$_3$ lens does not change on exposure to external light 9 even for prolonged periods of time and without any further packaging of the device, resulting in low-cost fabrication of the device. Further, there is little chance of moisture penetration into the As$_2$S$_3$ overlay, so that the Luneburg lens is not affected thereby.

On the other hand, it will be apparent that in the case of an ordinary lens without protective film layers 4 and 5, the divergent light 7 gradually becomes a convergent light 22 upon exposure to external light 9 and/or moisture and the focal point of the collimating Luneburg lens 50 becomes shorter and shorter from the initial focal point at focal plane 8.

It is particularly inconvenient to have a varying focal length for a collimating Luneburg lens when associated with a surface acoustic wave in a beam scanner where constant focal length and beam spot size are generally necessary.

Figure 3:
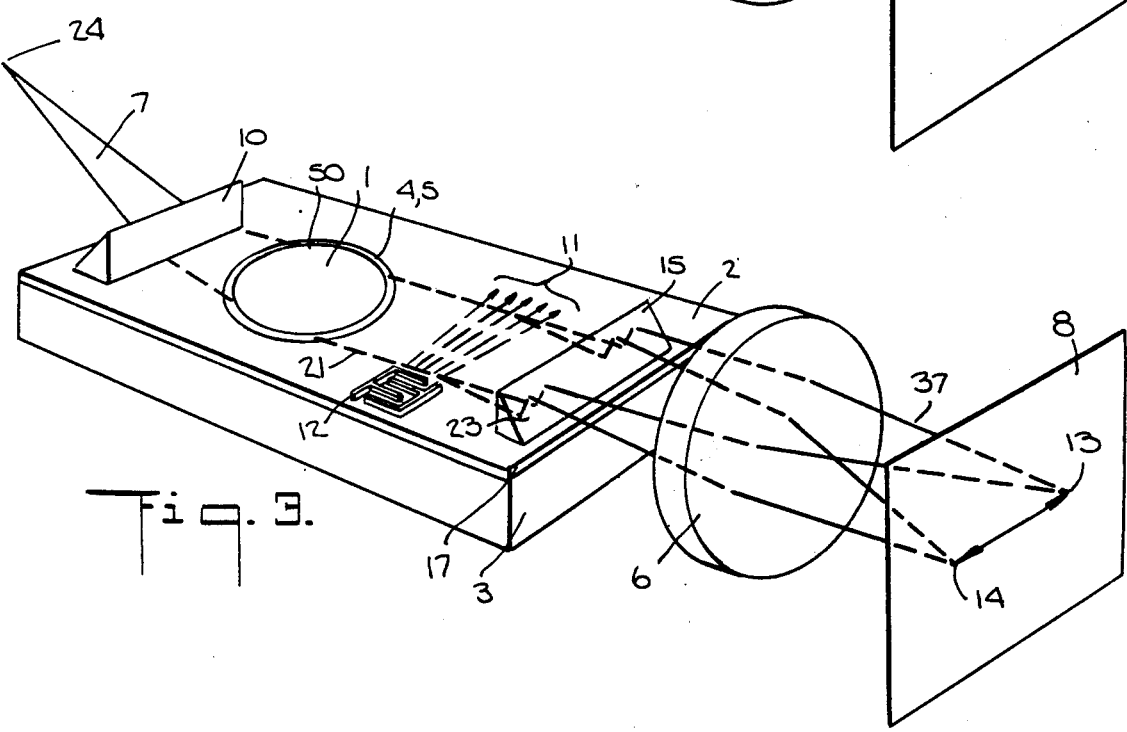
FIG. 3 is a perspective view of an integrated optics surface wave acousto-optical waveguide scanner incorporating the protected Luneburg lens of FIG. 1.

FIG. 3 illustrates such a device wherein an interdigital surface wave acoustic transducer 12 generates a surface acoustic wave (SAW) 11 in an optical waveguide 2 provided on a substrate 3. A divergent light beam 7 from a source 24 is coupled through a prism 10 to move through waveguide 2. A collimated sheet of light 2 from Luneburg lens 50 moves through waveguide 2 at appropriate Bragg angle, $\theta_B$, to the acoustic waves according to the frequency of the acoustic waves. The Bragg angles $\theta_B$ in waveguide 2 are given by:

$$\theta_B = \sin^{-1}\left[\frac{\lambda_o \nu}{2n\, v_a}\right]$$

where $\lambda_o$ is the light wavelength used, $\nu$ is the acoustic frequency, n is the effective index of waveguide 2 for the guided mode and $v_a$ is the velocity of the acoustic wave. The deflected light 23 is then out-coupled by a typical prism 15 from the waveguide 2 to air and is then focused to a beam spot 13 or 14, for example, by an auxiliary lens 6 at the focal plane 8. The beam spot moves from point 13 to point 14 within the Bragg angles $\theta_B'$ outside waveguide in air, which is given by Snell's law as $$\theta_B' = \sin^{-1}(n \sin \theta_B).$$

It will therefore be appreciated that by alternating the acoustic frequency in a cyclic manner, the light also scans from point 13 to point 14 in a cyclic manner.

From the foregoing it will be understood that by providing protective layers 4 and 5 on overlay 1, the focal length and hence the spot size at the fixed focal plane 8 does not change on exposure to external light 9 and/or moisture. This is an essential improvement for a complicated device such as an optical beam scanner.

EXAMPLE

An As$_2$S$_3$ lens was fabricated to have a 6 mm diameter and a center thickness of 0.6 microns on a Y-cut Ti in-diffused LiNbO$_3$ waveguide by mask evaporation from a quartz crucible with As$_2$S$_3$ fused glass. The lens had an original focal length of 10.3 cm but upon exposure to an incandescent lamp of 25 watts for 1 hour and 15 minutes, its focal length decreased to 3.7 cm.

The As$_2$S$_3$ lens was then coated with undiluted Polychrome S. F. positive photoresist, spun for 45 seconds at 3000 rpm, and baked at 90° C. for 30 minutes as a low index protecting layer. Then the sample was exposed to U.V. light for 3 seconds at 13 mW/cm$^2$, with a 10 mm diameter mask covering the Luneburg lens area. The exposed photoresist was developed away with Polychrome D900 developer. On top of the photoresist layer, an aluminum layer 1000 Å thick was deposited by evaporation through a 10 mm diameter mask.

The sample was then set back into the optical system. 6328 Å, $TM_o$ mode guided light did not seem to be absorbed by the combination of photoresist and aluminum layers. The output scanned beam appeared as bright as with no protective coating. The focal length of the $As_2S_3$ lens with protective layers did not change within practical tolerance, even on exposure to an incandescent lamp of 25 watts for several hours.

Having thus described the invention with particular reference to the preferred forms thereof, it will be obvious to those skilled in the art to which the invention pertains, after understanding the invention, that various changes and modifications may be made therein without departing from the scope of the invention as defined by the claims appended hereto. For example a single coating layer may be used if the material is transparent to the wavelength of the guided light but absorbs the shorter wavelengths which are detrimental to the Luneburg lens. Moreover, while $As_2S_3$ is the preferred lens material, the coating is useful on any Luneburg lens formed from a material which is affected by light, oxygen, water vapor or air.

What is claimed is:

1. A protected Luneburg lens device comprising:
   a Luneburg lens overlay formed on an optical waveguide, said overlay being of a material having a refractive index higher than that of said waveguide; and
   a protective coating on said overlay for protecting said material from atmospheric influences.
2. A protected Luneburg lens device according to claim 1, wherein said overlay material comprises $As_2S_3$.
3. A protected Luneburg lens device according to claim 2, wherein said waveguide is a titanium in-diffused $LiNbO_3$ waveguide.
4. A protected Luneburg lens device according to claim 1, wherein said protective coating comprises a first film layer having a refractive index lower than that of said overlay and a second film layer for reflecting external light.
5. A protected Luneburg lens device according to claim 4, wherein said first film layer has a thickness of about 1,000 Å or more.
6. A protected Luneburg lens device according to claim 5, wherein said second film layer is a highly reflective element formed of alternating layers of high and low refractive index dielectric materials.
7. A protected Luneburg lens device according to claim 4, wherein the refractive index of said first film layer is between about 1.30 and about 2.10.
8. A protected Luneburg lens device according to claim 4, wherein said second film layer has a thickness of about 500 Å or more.
9. A protected Luneburg lens device according to claim 4, wherein said second film layer is a metal film.

* * * * *